Nov. 19, 1940.  J. C. CROWLEY  2,222,460
LOCK NUT
Filed July 1, 1938
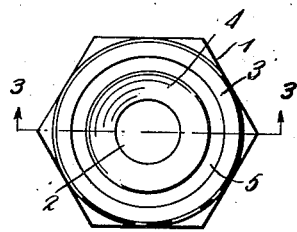
FIG. 2
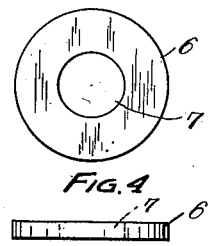
FIG. 4
FIG. 5
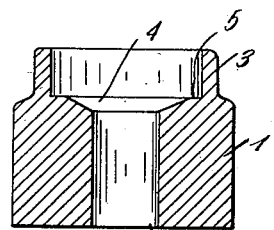
FIG. 3
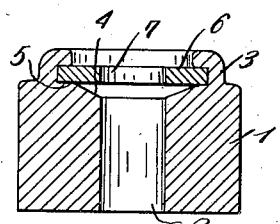
FIG. 6
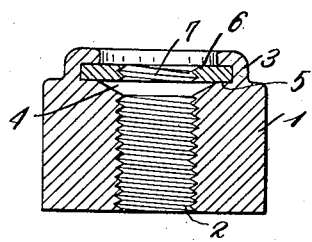
FIG. 7
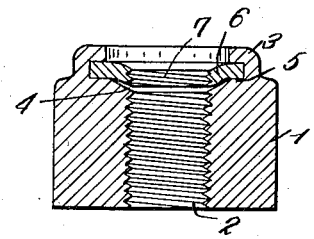
FIG. 8
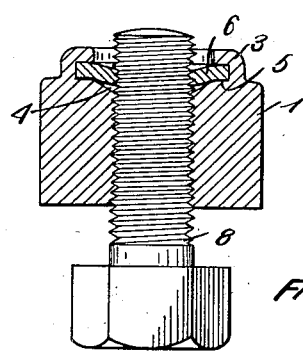
FIG. 9
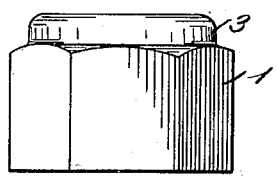
FIG. 1
INVENTOR.
JOHN C. CROWLEY
BY Kwis Hudson & Kent
ATTORNEYS Patented Nov. 19, 1940

2,222,460

UNITED STATES PATENT OFFICE 2,222,460

LOCK NUT

John C. Crowley, Cleveland Heights, Ohio, assignor to The Dill Manufacturing Company, Cleveland, Ohio, a corporation of Ohio Application July 1, 1938, Serial No. 216,972

1 Claim. (Cl. 151—21)

The present invention relates to a retention device or, more particularly, a specially prepared nut which is adapted to be associated with a threaded shank, such, for instance, as a threaded bolt. The nut and its associated part are so constructed that when the nut is threaded upon the bolt or similar threaded member the nut will be held against turning movement such as might be caused by vibration or conditions similar thereto, although it is possible to remove the nut from the threaded bolt by means of a suitable tool such as a wrench.

Reference should be had to the accompanying drawings, forming a part of this specification, in which:

Fig. 1 shows the nut in elevation;

Fig. 2 is a top plan view;

Fig. 3 is a section upon the line 3—3 of Fig. 2;

Fig. 4 is a top plan view of what may be described as a washer;

Fig. 5 is an edge view or elevation of the washer shown in Fig. 4;

Fig. 6 is a sectional elevation showing the washer assembled with respect to the nut;

Fig. 7 is a sectional elevation showing the nut and assembled washer after the threading operation;

Fig. 8 is a sectional elevation showing the nut and assembled washer with the central portion of the washer somewhat depressed; and Fig. 9 is an elevation with the nut and associated part in section, showing the nut threaded upon a bolt.

In carrying out the present invention, a nut body is formed by means already known and understood in the art, wherein the nut is provided with a body portion 1, a central opening 2, and an upstanding flange 3. The top of the nut proper is provided with a slight depression 4, this depression, however, being so formed that it leaves a ledge 5 adjacent the lower end of the flange 3. It may here be said that the particular form of the depression 4 as shown is not essential, as will later appear.

The nut may be made of any desired material and if the nut be made out of ferrous metal, or a metal which upon weathering tends to rust or oxidize, the nut may be suitably treated, such as by chromium plating or by any other process, several of which are well known, to protect the ferrous body against rusting or oxidizing action.

A disk member 6, which, for convenience, may be called a washer because of its general similarity to what is frequently termed a washer, is formed of metal and, in the present instance, it is my intention to make the washer of a metal such as bronze, that is to say a metal that is somewhat softer than steel and yet will have sufficient resistance to deformation as to give it a degree of elasticity. Where the nut is to be used upon a threaded member which has been chrome plated or otherwise treated to prevent rusting, the use of a bronze washer will not injure the plated surface on the threaded member.

The disk or washer 6 is preferably formed to have a round shape although this is not necessary; it may be given any other peripheral shape, the only limitation being that the peripheral shape of the disk or washer must correspond with the inner face of the flange 3 of the nut and it should be so formed that it will fit within the flange 3 and the peripheral edge of the disk or washer engaging in a reasonably close fit against the inner wall of the flange 3.

This disk or washer 6 is provided with an inner hole or opening 7, which is of the same diameter as the hole 2 throughout the nut. The thickness of the disk or washer 6 should be such that it will be able to take a fraction of a thread, a complete thread, or more than one complete thread.

In the process of manufacture the disk or washer 6 is placed within the recess in the top of the nut with its periphery in substantial contact with the inner wall of the upstanding flange 3 and then, by an upsetting operation, the flange 3 is turned over so as to engage with the washer.

As has been previously described, the top of the nut is provided with a flat portion such as indicated at 5 in Fig. 3, upon which the undersurface adjacent the periphery of the disk or washer 6 rests, so that when the flange 3 is turned over, as shown in Fig. 5, the edge portion of the disk or washer 6 is firmly held and pinched between the inturned flange 3 and the upper surface of the nut.

The next operation is the tapping of the hole 2 in the nut blank and the tapping of the hole or opening 7 in the disk or washer. The tapping of both the nut and the disk or washer 6 is done in the same operation. Since the threading operation performed upon the opening in the nut and the opening in the disk or washer 6 is by means of the same tap, it will be obvious that the threads in the opening in the disk or washer will be of the same pitch and form a continuation of the threads in the hole in the nut.

After the threading operation the disk or washer is deflected in either direction, by means of any suitable tool, from its horizontal position, as indicated in Fig. 8, so that it may be described as having a dished shape. The degree of deflection need not be very great but it will be observed that, by the operation which has been described, the threads in the opening of the disk or washer 6 will not be a true continuation of the threads in the hole in the nut 1, that is to say, the thread of the disk is out of lead with respect to the threads in the hole in the nut. When, therefore, the nut is screwed onto a threaded bolt, such as indicated at 8 in Fig. 9, as soon as the threaded bolt has passed through the threads in the opening or hole 2 of the nut 1, and entered into engagement with the threads in the hole in the disk or washer 6, there will be a tendency to move the disk or washer to its initial position before deflection so that the result is that a torsional friction or gripping action is produced between the threads of the washer and the threads of the bolt, and this gripping action is sufficient to maintain the nut in its adjusted position upon a bolt. In dishing the disk 6, the amount of dishing which is given to the disk is dependent upon how much "out of lead" it is desired to have the thread or threads of the disk with respect to the lead of the thread in the nut proper, and this in turn is a function of the hardness and resilience of the metal of the disk. In any event the amount of out of lead of the threads in the disk, with respect to the threads in the nut proper, is always such that the amount of movement imparted to the disk by the engagement of the threaded bolt with the threads in the disk will be such that the elastic limit of the metal of the disk is not exceeded so that when a nut such as herein described is used and then removed from the threaded bolt, it may be used again, which would be impossible if the flexing of the disk in the nut, when applied to a threaded bolt, was such as to flex the disk beyond its elastic limit or to such a degree as it would take a permanent set.

Obviously, while reference has been made to the fact that the disk is preferably made of bronze, it might readily be made of other metal or other material and, as will be understood, these different materials might have different elastic or flexing properties. Consequently, the degree of "out of lead" which the threads in the disk have, with respect to the threads in the nut, is not a definite thing but will vary somewhat according to the elasticity or flexing properties of the metal of the disk, the hardness of the metal, the thickness of the metal of the disk, and the pitch and diameter of the thread in the nut.

However, the amount of "out of lead" of the threads in the disk with respect to the threads in the nut can be readily ascertained with respect to a given disk of given thickness and of a given metal, and when once determined it will be the same for all similar disks.

Of course, it will be understood that the flat face of the nut will always be brought into contact with a surface of the object with which the bolt is cooperative, that is, where two members are held together by the bolt and nut structure, the face of the nut comes into contact with one of the members and there is a certain amount of retention force set up by the engagement of the bolt with the surface in question. Where, however, the object, in connection with which the bolt is used, is subject to vibration or strains of any character, there is a tendency for the nut to work loose. However, this tendency to work loose, by virtue of the frictional engagement of the disk or washer 6 with the threads of the bolt, is overcome.

It will be understood that whereas reference has been made to a bolt in the foregoing description, the same action would obtain where a nut is used in connection with a threaded member.

Having thus described my invention, I claim:

A lock nut comprising a metal body having a threaded hole therethrough and provided on one end face with a depression surrounded by a flange, a disk separate from said body and located in said depression and formed of metal having elasticity and sufficiently soft so as not to injure the threads of the bolt to which the nut is applied, said flange on said body being inturned against said disk to hold the same in said depression against rotation and bodily axial movement, said disk having an opening therethrough which originally was concentric to and the same diameter as the threaded hole in said body, said disk being provided in the wall defining said opening with threads of the same pitch as the threads of the body, said disk being dished in an axial direction to place the threads of the opening out of lead with respect to the threads of the hole through the body to an extent proportioned to the elasticity, hardness and thickness of the metal disk and the pitch and diameter of the threads in the hole through the body so as to produce a binding effect on the threads of the bolt to which the nut is applied.

JOHN C. CROWLEY.